UNITED STATES PATENT OFFICE.

JESSE A. DUBBS, OF PITTSBURG, PENNSYLVANIA.

PAVING MATERIAL AND MANUFACTURE THEREOF.

No. 862,318.  Specification of Letters Patent.  Patented Aug. 6, 1907.

Application filed November 16, 1906. Serial No. 343,688.

*To all whom it may concern:*

Be it known that I, JESSE A. DUBBS, residing at Pittsburg, in the county of Allegheny and State of Pennsylvania, a citizen of the United States, have invented 5 or discovered certain new and useful Improvements in Paving Material and Manufacture Thereof, of which improvements the following is a specification.

The invention described herein relates to certain improvements in the manufacture of pavements, which 10 usually consist of a body formed of sand, or crushed stone or other like materials, or a mixture of two or more thereof, and asphaltic cement.

In the practice of my invention a body preferably of dried sand and crushed stone are thoroughly mixed 15 with about ten per cent more or less of Portland or other suitable cement. Asphaltic cement is then added and thoroughly mixed with the body and cement. After the asphaltic cement is stirred in as stated and while the mixture is still hot, water in the form of wet steam 20 or boiling water sufficient to supply the needs of the Portland or other cement, is added and thoroughly stirred in. The water thus added does not appear to combine at once with the cement, but probably forms an emulsion with the asphalt from which it is absorbed in a few days by the cement. As soon as the cement has 25 taken up sufficient water it will set rendering the mixed materials very hard and durable. The material thus prepared can be spread while hot as is customary to form the wearing surface of a pavement or may be molded into bricks. 30

I claim herein as my invention:

1. As an improvement in the art of forming paving material, the method herein described which consists in thoroughly mixing a body and cement adding asphalt to such mixture and finally mixing water with the mingled body, 35 cement and asphalt.

2. As an improvement in the art of forming paving material, the method herein described, which consists in mixing dried sand, crushed stone and cement, adding asphalt to such mixture and finally mixing water with the mingled 40 asphalt, sand, crushed stone and cement.

3. A paving material consisting of sand, crushed stone, cement, asphalt and water.

In testimony whereof, I have hereunto set my hand.

JESSE A. DUBBS.

Witnesses:
CHARLES BARNETT,
WILLIAM H. WILSON.